United States Patent
Prendergast et al.

(10) Patent No.: US 12,005,538 B2
(45) Date of Patent: Jun. 11, 2024

(54) METHODS AND SYSTEMS FOR SUPPORTING AND POSITIONING MECHANICAL COMPONENTS OR TOOLS

(71) Applicant: The Boeing Company, Chicago, IL (US)

(72) Inventors: Matthew Lee Prendergast, Covington, WA (US); Nicholas J. Brimlow, Sammamish, WA (US); Arthur Eugene Whitson, Jr., Bainbridge Island, WA (US); James T. Johnstone, Burien, WA (US)

(73) Assignee: The Boeing Company, Arlington, VA (US)

( * ) Notice: Subject to any disclaimer, the term of this patent is extended or adjusted under 35 U.S.C. 154(b) by 371 days.

(21) Appl. No.: 17/334,310

(22) Filed: May 28, 2021

(65) Prior Publication Data
US 2022/0032412 A1    Feb. 3, 2022

Related U.S. Application Data

(60) Provisional application No. 63/057,821, filed on Jul. 28, 2020.

(51) Int. Cl.
*B23Q 1/26* (2006.01)
(52) U.S. Cl.
CPC ...................... *B23Q 1/26* (2013.01)
(58) Field of Classification Search
CPC ........................................................ B23Q 1/26
(Continued)

(56) References Cited

U.S. PATENT DOCUMENTS 2,362,991 A    11/1944   Dahl
6,663,498 B2 *  12/2003  Stipan ................ A63B 69/3652
                                                        403/53
(Continued)

OTHER PUBLICATIONS

Eaton's Crouse-Hinds Business, "Arktite Circuit Breaking CPS Receptacles and CPP Plugs" retrieved from www.cooperindustries.com/content/dam/public/crousehinds/industrial-products/catalog-pdfs/pr/arktite-cpp-cps-plugs-receptacles.pdf on Jun. 9, 2020, 4 pages, 2013.
(Continued)

*Primary Examiner* — Jose V Chen
(74) *Attorney, Agent, or Firm* — Kolisch Hartwell, P.C.

(57) ABSTRACT

Methods and systems for supporting and/or positioning mechanical components or tools, the methods and system employing work stands that have a moveable base, a vertical support member disposed on the moveable base, a support platform attached to an upper end of the vertical support member via a support coupling that permits independent rotational movement of the support platform, a plurality of extendable arms that are each pivotally coupled at a lower end to the vertical support member and pivotally coupled at an upper end to the support platform, and each extendable arm can be independently and controllably extended and retracted. The work stands further include a controller for controllably extending and retracting the extendable arms to position the support platform in a desired orientation, and a user input coupled to the controller and configured so that a user employing the controller can position the support platform in the desired orientation.

20 Claims, 17 Drawing Sheets

(58) Field of Classification Search
USPC .................. 108/6, 7; 248/554, 556, 555
See application file for complete search history.

(56) References Cited

U.S. PATENT DOCUMENTS

| | | | | |
|---|---|---|---|---|
| 11,506,087 | B2* | 11/2022 | Troop | F02C 7/20 |
| 2012/0110816 | A1* | 5/2012 | Groves | F01D 25/285 |
| | | | | 254/7 C |
| 2013/0306830 | A1* | 11/2013 | Acuna | F01D 25/28 |
| | | | | 280/400 |
| 2014/0353894 | A1* | 12/2014 | DesJardien | B23Q 1/035 |
| | | | | 269/21 |
| 2015/0136935 | A1* | 5/2015 | Hallam | B64F 5/50 |
| | | | | 248/554 |
| 2015/0316197 | A1* | 11/2015 | Morey | B62B 3/001 |
| | | | | 248/556 |
| 2017/0107858 | A1* | 4/2017 | Murphy | F01D 25/285 |
| 2018/0169807 | A1* | 6/2018 | DesJardien | B23Q 1/25 |
| 2019/0322391 | A1* | 10/2019 | Lamadon | B64F 5/50 |
| 2020/0398388 | A1* | 12/2020 | Shibahara | B23Q 16/06 |
| 2021/0046595 | A1* | 2/2021 | Liu | B25J 9/0072 |
| 2021/0053166 | A1* | 2/2021 | Lagger | B23Q 39/042 |

OTHER PUBLICATIONS

Nautica Expo, "Yacht Ladder / Lateral / Boarding / Manual" retrieved from www.nauticexpo.com/prod/besenzoni-spa/product-21536-284668.html on Jun. 9, 2020, 9 pages.

New Wave Fabrication, "Tide Rider Boarding Stairs" retrieved from www.newwavefab.com/tide-rider-stairs/ on Jun. 9, 2020, 2 pages.

New Wave Fabrication, "Boarding Stairs" retrieved from www.newwavefab.com/wp-content/uploads/hmpg_yacht_strs_1-21.pdf on Jun. 9, 2020, 1 page.

Eaton, "Eaton's B-Line Series Safety Gratings" retriived from www.cooperindustries.com/content/dam/public/bline/Resources/Library/catalogs/safety_gratings/traction_tread/GSMTT-13R.pdf on Jun. 9, 2020, 10 pages.

H&D Molding Incorporated, "Foam Bumpers/Headknockers" retrieved from www.hdmolding.com/pdf/Catalog1.pdf on Jun. 9, 2020, 6 pages.

* cited by examiner

METHODS AND SYSTEMS FOR SUPPORTING AND POSITIONING MECHANICAL COMPONENTS OR TOOLS

CROSS-REFERENCES

This application claims the benefit under 35 U.S.C. § 119(e) of the priority of U.S. Provisional Patent Application Ser. No. 63/057,821, filed Jul. 28, 2020, the entirety of which is hereby incorporated by reference for all purposes.

FIELD

This disclosure relates to work stands for facilitating the support and positioning of desired mechanical components and/or tools during equipment construction or maintenance. More particularly, the disclosure relates to work stands to facilitate construction or maintenance of aircraft.

INTRODUCTION

Service and maintenance operations on commercial or military aircraft have typically required the use of one or more overhead cranes to lift aircraft components and align them properly for installation.

Unfortunately, suspending loads in this way creates an occasionally hazardous work environment, where heavy components can swing unpredictably and strike workers, or pinch a worker's hand between a component and the aircraft. An inherent hazard can even be created whenever a worker passes beneath a suspended component.

Furthermore, a dependence upon overhead cranes can result in an effective requirement that aircraft maintenance and repair procedures be carried out within hangers or other facilities that possess overhead cranes. When such spaces are limited aircraft must wait for a space to become available, delaying service and maintenance operations.

An alternative to the use of conventional overhead cranes could therefore improve the safety and the speed of aircraft construction and/or maintenance operations.

SUMMARY

The present disclosure provides methods and systems for supporting and/or positioning mechanical components or tools, where the methods and systems employ work stands having a moveable base, a vertical support member disposed on the moveable base, a support platform attached to an upper end of the vertical support member via a support coupling.

In some examples, the present disclosure relates to a work stand for a mechanical component or tool, where the work stand can include a moveable base, a vertical support member disposed on the moveable base, and a support platform configured to directly or indirectly support the mechanical component or tool, where the support platform can be attached to an upper end of the vertical support member via a support coupling that permits independent rotational movement between the support platform and the upper end of the vertical support member around two orthogonal axes. The work stand can additionally include a plurality of extendable arms, with each extendable arm being pivotally coupled at a lower end to the vertical support member, and each upper end pivotally coupled to the support platform, with each extendable arm configured to be independently and controllably extended and retracted. A controller can be coupled to each of the plurality of extendable arms and configured to independently control the length of each extendable arm by controllably extending and retracting the extendable arm, so that the controller can position the support platform in a desired orientation by cooperatively adjusting the length of each of the extendable arms. A user input can be coupled to the controller and configured so that a user employing the controller can position the support platform in the desired orientation.

In some examples, the present disclosure relates to a system for supporting one or more mechanical components or tools, where the system can include a work stand having a wheeled base, a vertical support member disposed on the wheeled base that is configured to be controllably raised and lowered with respect to the moveable base, a support platform to directly or indirectly support the mechanical component or tool, where the support platform can be attached to the upper end of the vertical support member via a support coupling that permits independent rotational movement between the support platform and the upper end of the vertical support member around two orthogonal axes.

The work stand can further include three extendable arms, each arm being pivotally coupled at a lower end to the vertical support member and pivotally coupled at an upper end to the support platform, with each extendable arm capable of being independently and controllably extended and retracted. The work stand can further include a controller coupled to each of the three extendable arms and the vertical support member, wherein the controller can be configured to independently control a length of each extendable arm by controllably extending and retracting the extendable arm, so that the controller can position the cradle in a desired orientation. The controller can be configured to raise and lower the vertical support member, so that the controller can position the cradle at a desired elevation. The work stand can further include a user input coupled to the controller, so that a user employing the controller can position the cradle in the desired orientation. The work stand can further includes one or more cradles that are adapted to be supported by the support platform, where each cradle can be configured to support one or more mechanical components or tools.

In some examples, the present disclosure relates to a method of positioning a mechanical component or tool, the method including attaching a cradle to a support platform of a work stand, where the cradle can be configured to support one or more mechanical components or tools, and the support platform can be attached to an upper end of a vertical support member of the work stand via a support coupling that permits independent rotational movement between the support platform and the upper end of the vertical support member around two orthogonal axes, and where the vertical support member is disposed on a moveable base and can be configured to be controllably raised and lowered with respect to the moveable base to achieve a desired elevation of the support platform and therefore of the cradle. The support platform can be coupled to the vertical support member by three extendable arms, each extendable arm being pivotally coupled at a lower end to the vertical support member, and pivotally coupled at an upper end to the support platform; where each extendable arm can be independently and controllably extended and retracted to achieve a desired orientation of the support platform and therefore of the cradle. The method can further include placing the mechanical component or tool on the cradle, positioning the mechanical component or tool using a controller configured to independently and controllably extend and retract each extendable arm, and to raise and lower the vertical support member.

Features, functions, and advantages of the disclosed work stands, systems, and methods can be achieved independently in various examples of the present disclosure, or can be combined in yet other examples, further details of which can be seen with reference to the following description and drawings.

DETAILED DESCRIPTION

Figure 1:
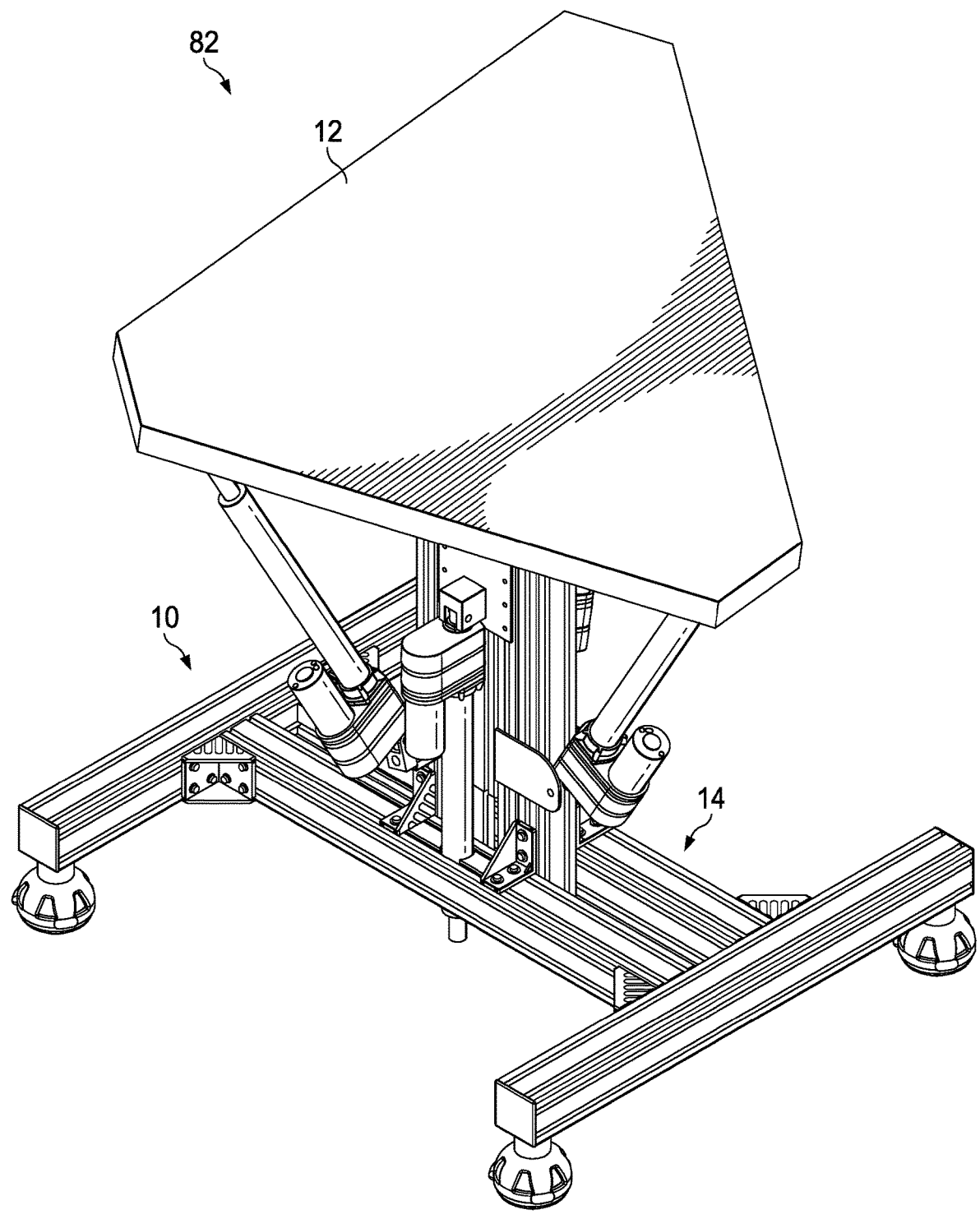
FIG. 1 depicts an illustrative work stand system, according to the present disclosure.

Various methods, systems, and work stands for aircraft assembly and maintenance are described below and illustrated in the associated drawings. Unless otherwise specified, the methods, systems, and work stands may, but are not required to, contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein may be included in other similar devices and methods, including being interchangeable between disclosed examples. The following description of various examples is merely illustrative in nature and is in no way intended to limit the examples, their applications, or their uses. Additionally, the advantages provided by the examples and embodiments described below are illustrative in nature and not all examples and embodiments provide the same advantages or the same degree of advantages.

This Detailed Description includes the following sections, which follow immediately below: (1) Definitions; (2) Overview; (3) Examples, Components, and Alternatives; (4) Illustrative Combinations and Additional Examples; (5) Advantages, Features, and Benefits; and (6) Conclusion.

(1) DEFINITIONS

The following definitions apply herein, unless otherwise indicated.

"Aircraft assembly" means combining one or more aircraft components as part of the manufacture of an aircraft or an aircraft subsystem.

"Maintenance" includes any and all aspects of maintenance, repair, and overhaul (MRO) of an aircraft. Aircraft maintenance includes the performance of any task required to ensure the continuing airworthiness of the aircraft, aircraft subsystem, or aircraft part; including overhaul, inspection, replacement, defect rectification, disassembly, modification, ensuring airworthiness, and repair, without limitation.

"Coupled" means to be in such relation that the performance of one influences the performance of the other, may include being connected, either permanently or releasably, whether directly or indirectly through intervening components, and is not necessarily limited to physical connection(s).

"Substantially" means to be predominantly conforming to the particular dimension, range, shape, concept, or other aspect modified by the term, such that a feature or component need not conform exactly, so long as it is suitable for its intended purpose or function. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, in the order they are introduced in a particular context and are not intended to show serial or numerical limitation, or be fixed identifiers for the group members.

(2) OVERVIEW

The present disclosure is directed to work stands having a moveable base, a vertical support member disposed on the moveable base, and a support platform attached to an upper end of the vertical support member via a support coupling, as well as systems methods and systems that employ the work stands for supporting and/or positioning mechanical components or tools.

Although the work stands of the present disclosure are described in the context of aircraft assembly and/or maintenance, the utility and enhanced performance of the disclosed work stands may be advantageous for any of a wide variety of industries, and in particular may be useful wherever there is a need for supporting the tool or component in a desired position or orientation.

(3) EXAMPLES, COMPONENTS, AND ALTERNATIVES

FIG. 1 depicts a work stand 10 according to the present disclosure that is coupled to and supporting a cradle 12, where cradle 12 is generally configured to support a load. In particular, cradle 12 can be configured to support one or more mechanical components or tools during assembly or maintenance of a mechanical system.

Figure 2:
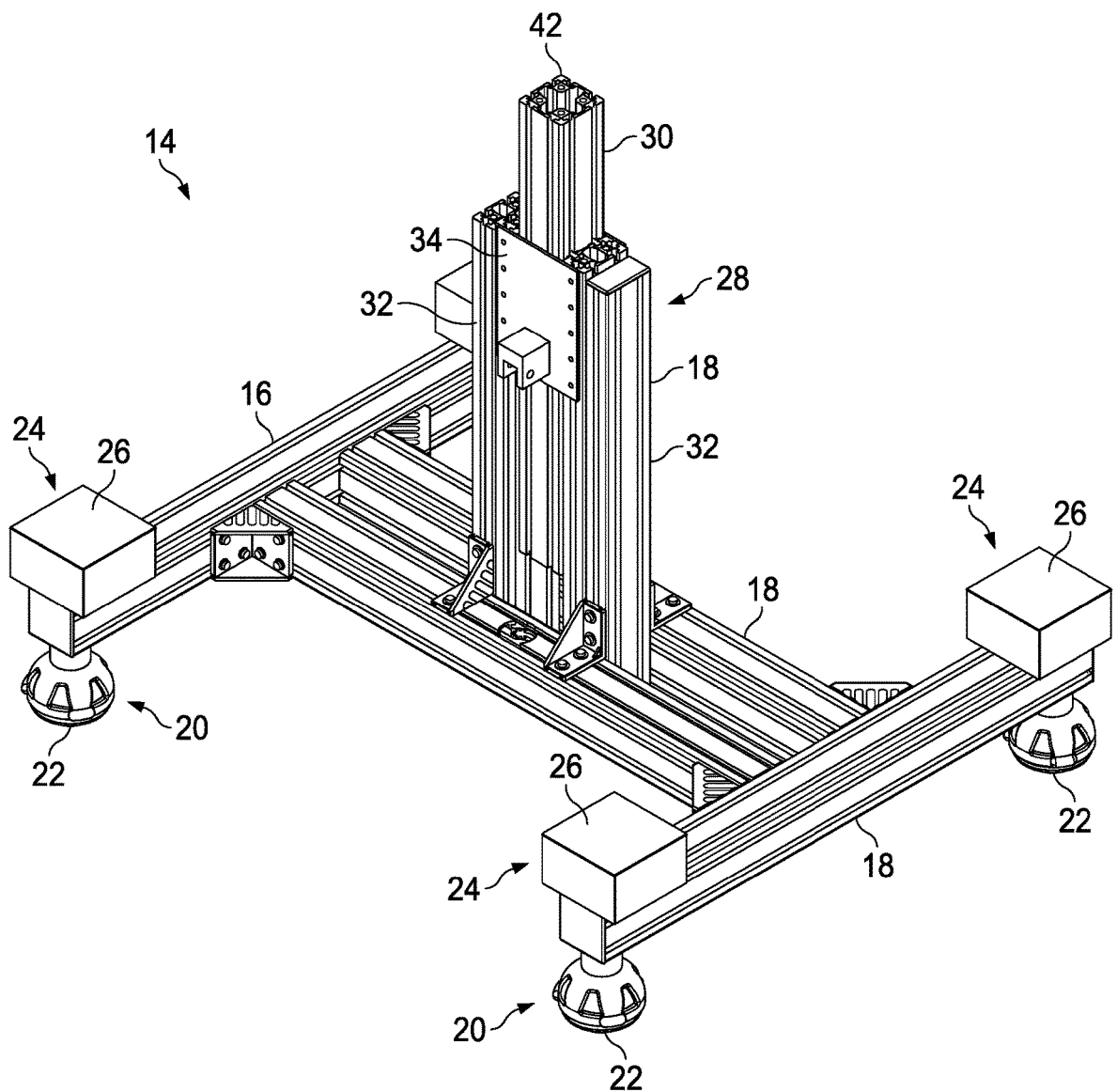
FIG. 2 depicts a moveable base of an illustrative work stand, according to the present disclosure.

As shown in FIG. 2, work stand 10 includes a moveable base 14. Moveable base 14 preferably has a configuration that is both strong and stable, as work stand 10 may be required to support and stabilize large, heavy, and/or ungainly components or tools. For example, moveable base 14 can include a base frame 16 having an I-shape, constructed of strong but light strut segments 18, as shown in FIG. 2. Any sufficiently strong strut may be used in assembling moveable base 14, particularly strut segments that are configured to be easily connected into desired assemblages. As one example, moveable base 14 can be assembled using commercially available strut segments and connectors from the Aluminum Structural Framing System of BOSCH REXROTH CORPORATION (Charlotte, North Carolina), among others.

Moveable base 14 can include one or more mobility apparatus 20 configured to facilitate movement of moveable base 14. For example, moveable base 14 can include one or more continuous tracks, rollers, or air cushions. Alternatively, moveable base 14 can be configured to ride on a set of fixed rails within a fixed work area. More typically, moveable base 14 can include one or more wheels 22 to permit movement of moveable base 14. As described herein, wheels 22 can include conventional wheels, wheel-based casters, or ball casters. Wheel-based casters that incorporate a swivel connection to frame 16, or ball casters, can be particularly advantageous as they can facilitate movement of moveable base 14 in any direction.

Moveable base 14 can optionally include a tow interface to facilitate coupling to a vehicle or other towing/pushing device. For example, moveable base can include a hitch that can be fixed or deployable, where the hitch can permit moveable base 14 to be towed or pushed into a desired position by a towing/pushing device such as a tractor, or an aircraft tug that is typically used for the ground movement of aircraft.

Alternatively, or in addition, the mobility apparatus 20 can further include one or more drive mechanisms 24 for driving one or more of wheels 22, so that moveable base 14 can be self-propelled. Any drive mechanism sized to fit on moveable base 14 and deliver adequate power to one or more wheels 22 can be an appropriate drive mechanism for the purposes of the present disclosure. In particular, moveable base 14 can include one or more electric drive mechanisms 26 to supply power directly to wheels 22. As shown, one or more wheels 22 can each be equipped with a dedicated drive mechanism 26 to supply power to that wheel, with each drive mechanism 26 coupled to base frame 16. Each drive mechanism 26 can typically be powered individually or in coordination. Mobility apparatus 20 can additionally incorporate a steering mechanism (not shown) to permit moveable base 14 to be driven in any desired direction.

Moveable base 14 can additionally include a vertical support bracket 28 disposed and coupled to frame 16 of moveable base 14. Vertical support bracket can be adapted to support and retain a vertical support member 30 that can be configured to be translated vertically with respect to moveable base 14. For example, as shown in FIG. 2, vertical support bracket 28 includes fixed vertical trusses 32 attached to base frame 16 and connected by support plates 34. Vertical support member 30 is disposed within a space defined by fixed vertical trusses 32 and support plates 34, but is connected to neither the vertical trusses or the support plates. Vertical support member 30 is therefore free to be moved vertically, i.e. raised and lowered, within the vertical support bracket. Similar to base frame 16, vertical support member 30 as well as vertical trusses 32 can be constructed using strut segments and connectors from the Aluminum Structural Framing System of BOSCH REXROTH CORPORATION, or other suitable struts.

Figure 3:
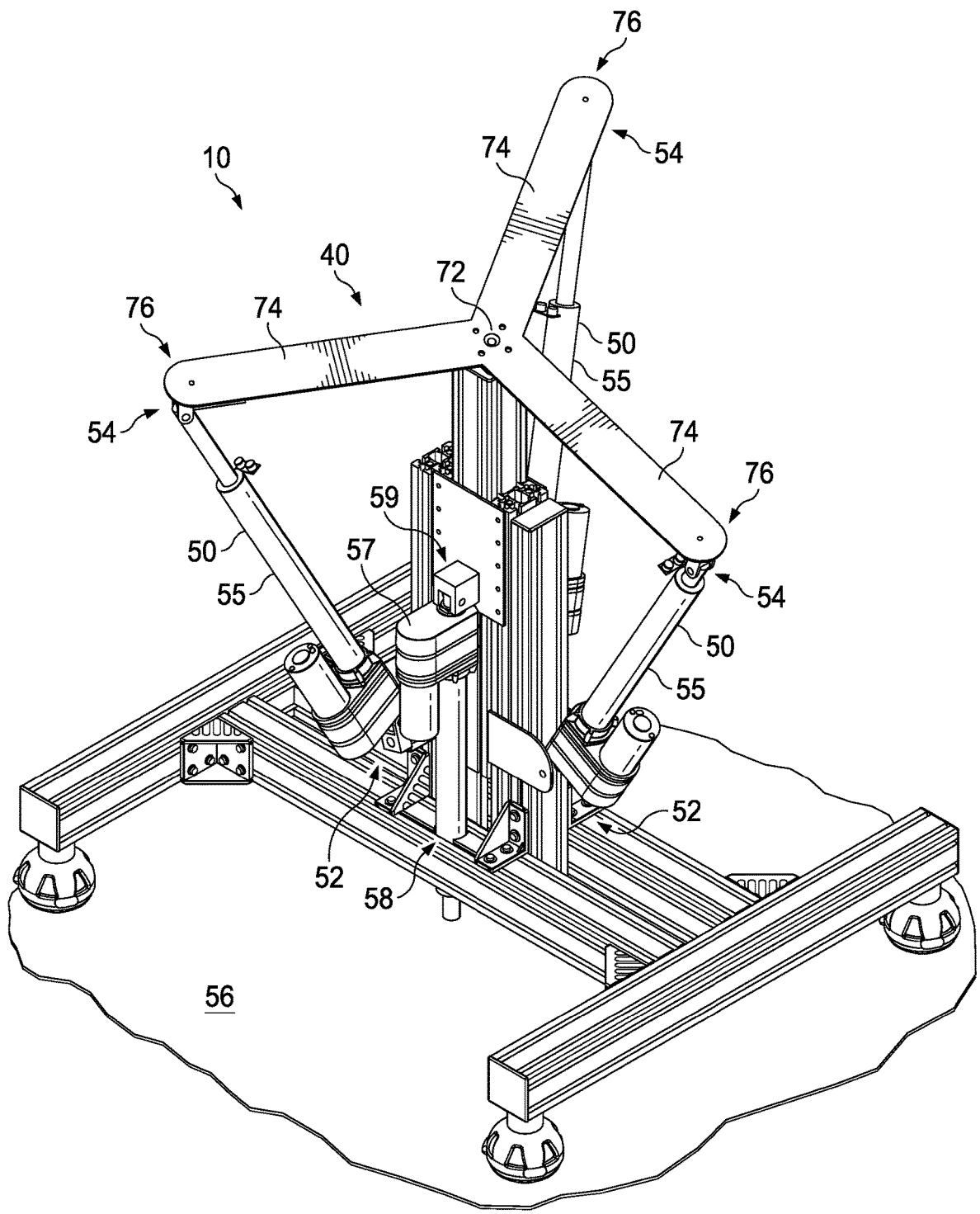
FIG. 3 depicts an illustrative work stand, according to the present disclosure.
Figure 4:
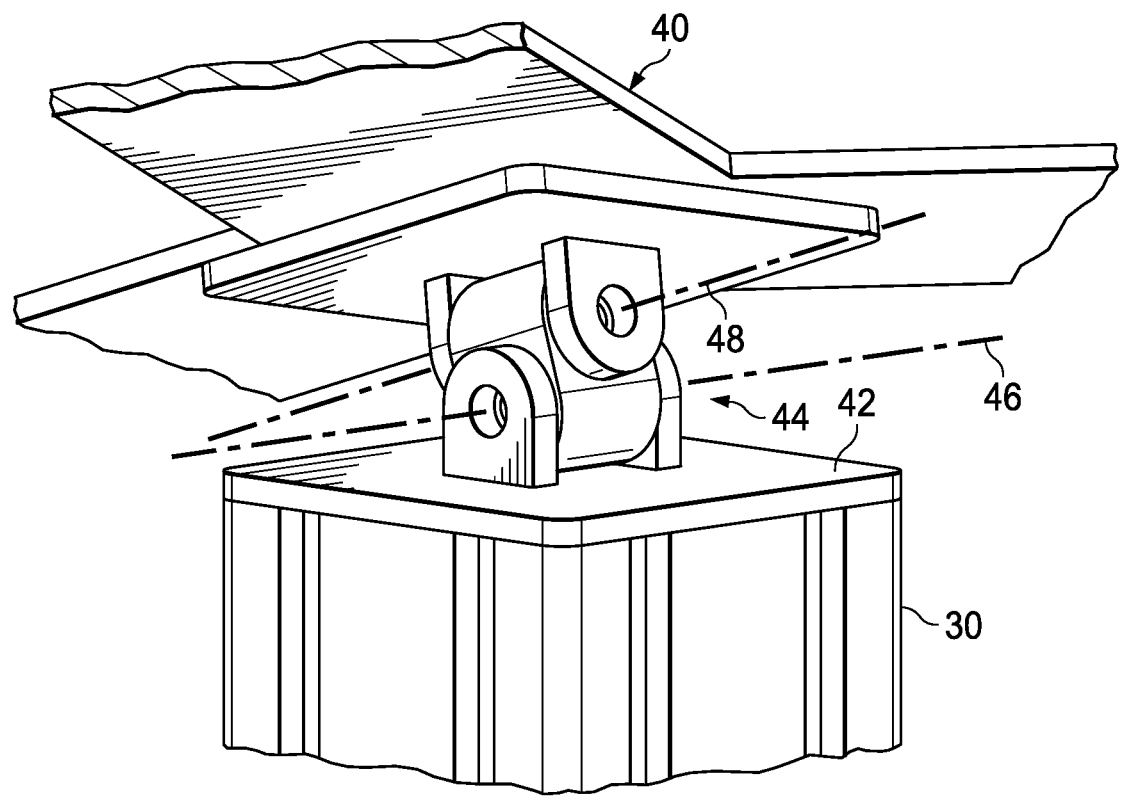
FIG. 4 depicts a gimbaled support coupling of the illustrative work stand.

As shown in FIG. 3, moveable base 14 can be configured to support and stabilize a support platform 40, where support platform 40 is attached to an upper end 42 of vertical support member 30. Support platform can be configured to directly or indirectly support a mechanical component or tool during assembly or maintenance of a mechanical system. In order to facilitate the orientation of the mechanical component or tool, support platform 40 can be attached to upper end 42 of vertical support member 30 via a support coupling 44 that permits independent rotational movement between support platform 40 and upper end 42 of vertical support member 30 around two orthogonal axes. For example, support platform 40 can be coupled to upper end 42 of vertical support member 30 via a flexible and resilient material, a ball-and-socket joint, or a gimbal coupling that permits support platform 40 to assume a wide range of orientations with respect to moveable base 14. For example an exemplary support coupling 44 that incorporates a gimbal is shown in FIG. 4. The construction of the gimbal permits the support coupling 44 to engage in rotational movement between support platform 40 and upper end 42 of vertical support member 30, and in particular permits independent rotation of support platform 40 around rotation axis 46 and rotation axis 48, which are orthogonal to one another.

The angle of support platform 40 with respect to upper end 42 of vertical support member 30, or with respect to moveable base 14 as a whole, can be determined by the cooperative operation of a plurality of extendable arms 50 that can be used to couple moveable base 14 to support platform 40. As shown in FIG. 3, each of the plurality of extendable arms 50 can be pivotally coupled at a lower end 52 of the extendable arm 50 to vertical support member 30, and pivotally coupled at an upper end 54 to support platform 40. Additionally, each of the plurality of extendable arms 50 can be configured to be independently and controllably extended and retracted.

Figure 5:
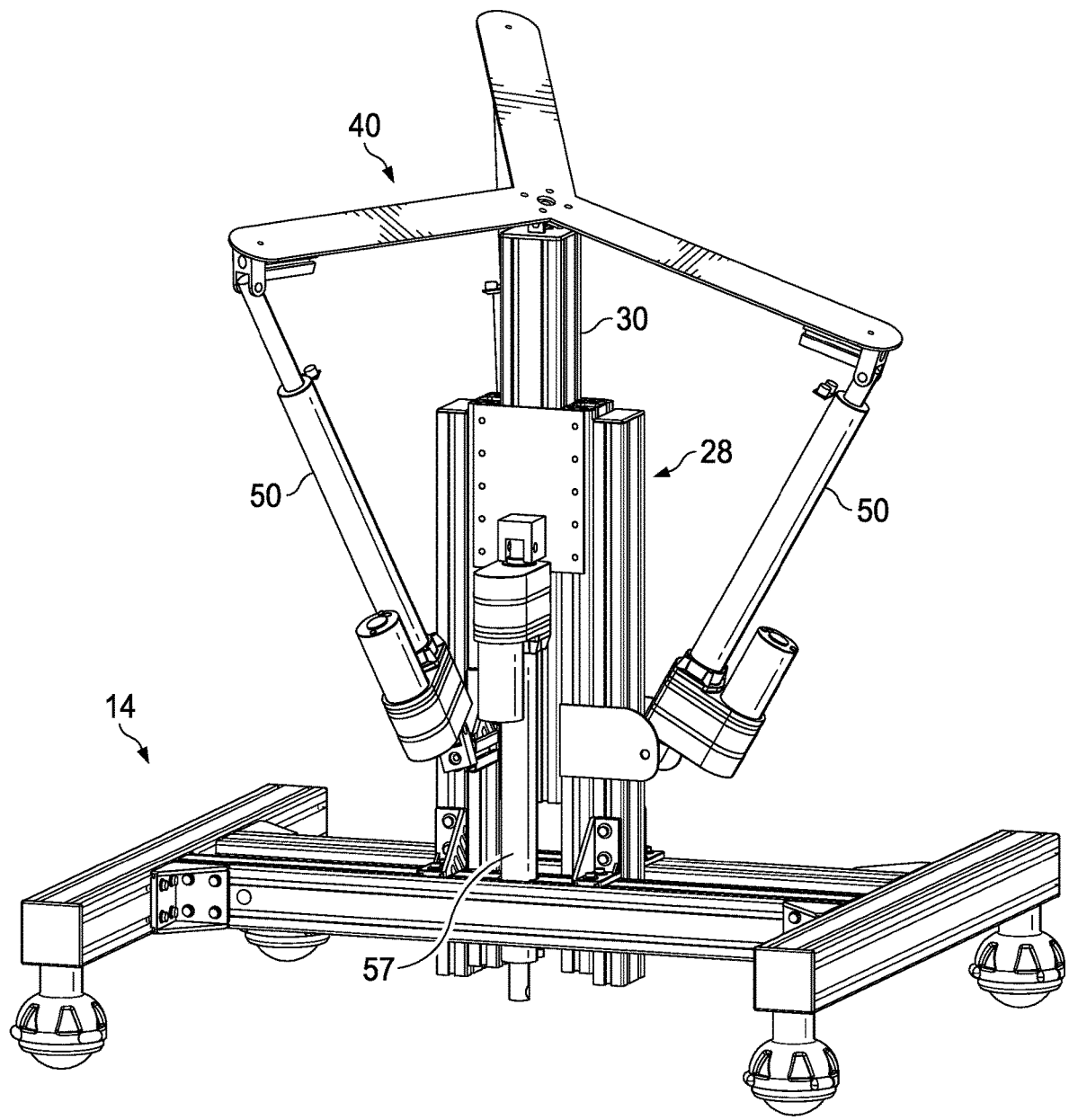
FIG. 5 depicts the illustrative work stand in a configuration disposing the support platform at an angle with respect to a horizontal plane.

For example, FIG. 5 depicts work stand 10 of the present disclosure where the length of each of the plurality of extendable arms 50 is selected so as to dispose support platform 40 at a desired angle and orientation with respect to a horizontal plane.

Any mechanism for independently and controllably changing the length of each of the plurality of extendable arms 50 that permits the selection of a desired orientation of support platform 40 is a suitable mechanism. In particular, each of the plurality of extendable arms 50 can be or can incorporate an arm linear actuator 55. Although electromechanical linear actuators perform advantageously when used as or for the plurality of extendable arms 50, a wide variety of alternative linear actuator mechanisms can also be used as arm linear actuators 55 for work stand 10, including mechanical linear actuators, hydraulic linear actuators, pneumatic linear actuators, and piezoelectric linear actuators, among others.

Figure 6:
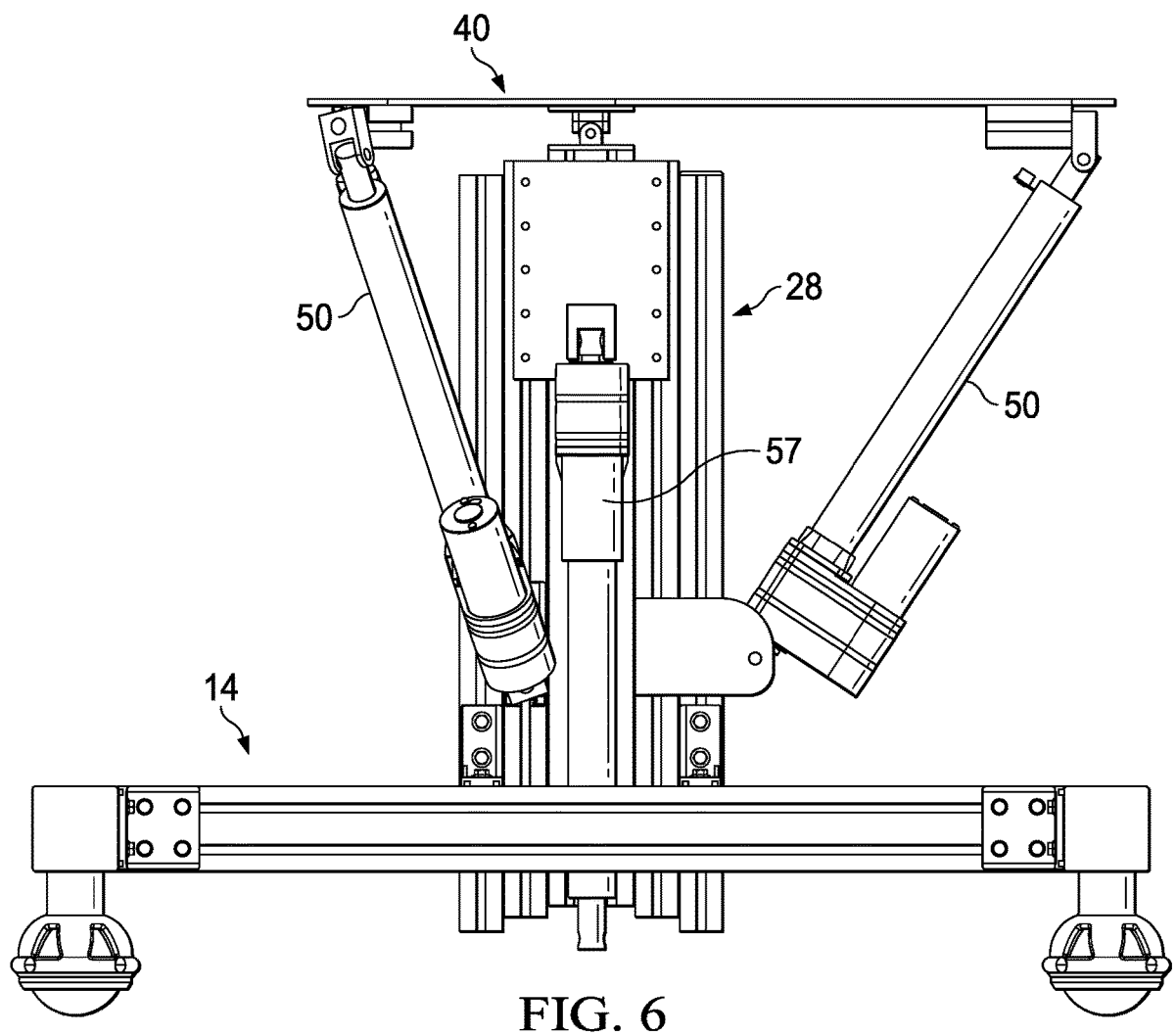
FIG. 6 depicts the illustrative work stand in a configuration having all extendable arms retracted and the vertical support member lowered.
Figure 7:
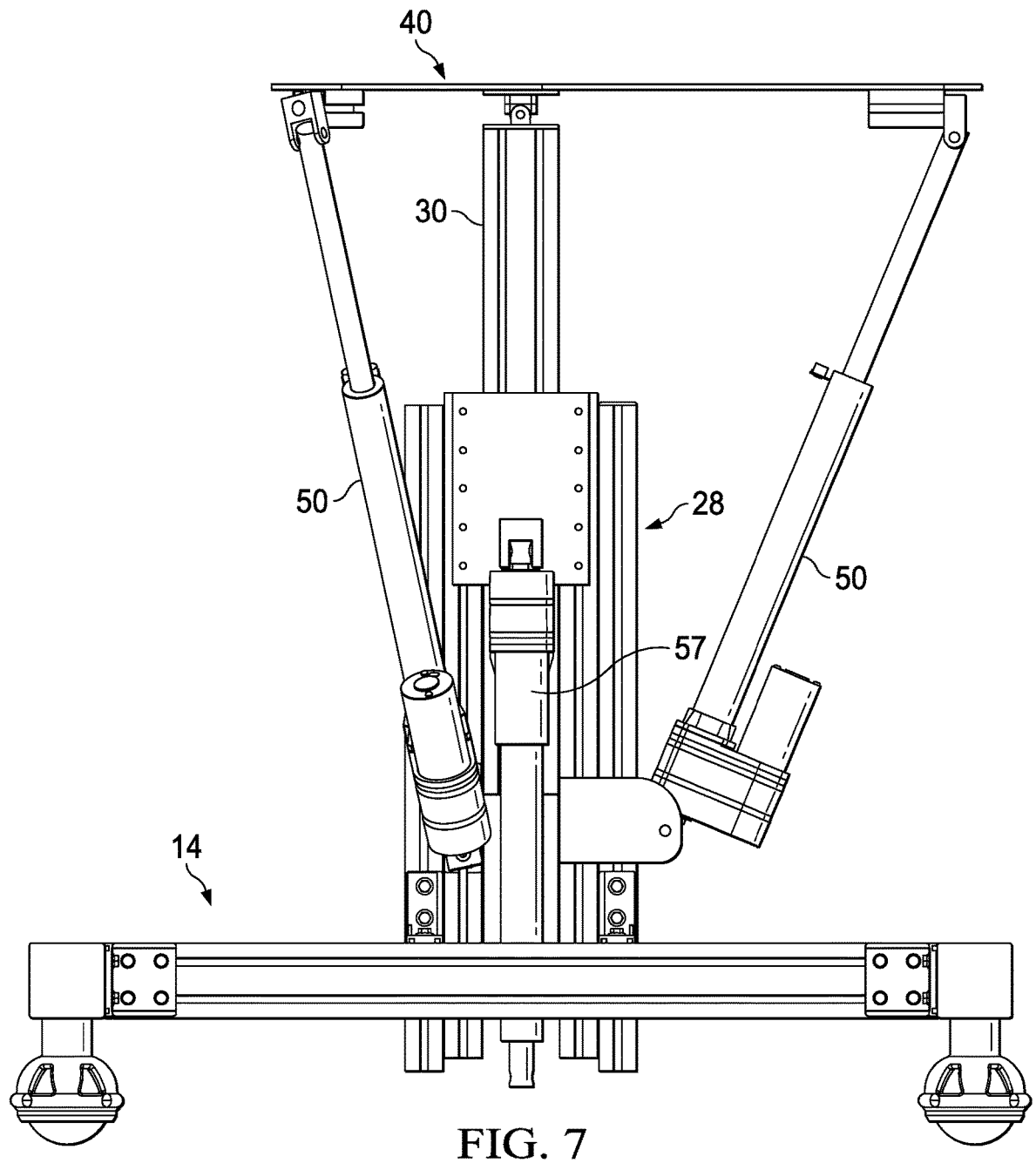
FIG. 7 depicts the illustrative work stand in a configuration having all extendable arms extended and the vertical support member elevated.

As vertical support member 30 is capable of moving vertically within vertical support bracket 28, the height of support platform 40 above work surface 56 can be adjusted by cooperatively adjusting the length of the plurality of extendable arms 50. For example FIG. 6 depicts work stand 10 in a configuration where a length of each of the plurality of extendable arms 50 is selected to achieve both an orientation of support platform 40 that is substantially horizontal, and disposes support platform 40 at a minimum elevation from work surface 56. The height of support platform 40 can be increased (with or without changing the angle of orientation of the support platform) by lengthening each of the plurality of extendable arms 50, as shown by work stand 10 of FIG. 7, where the work stand is in a configuration that places support platform at a greater elevation than does the configuration of FIG. 6.

Figure 8:
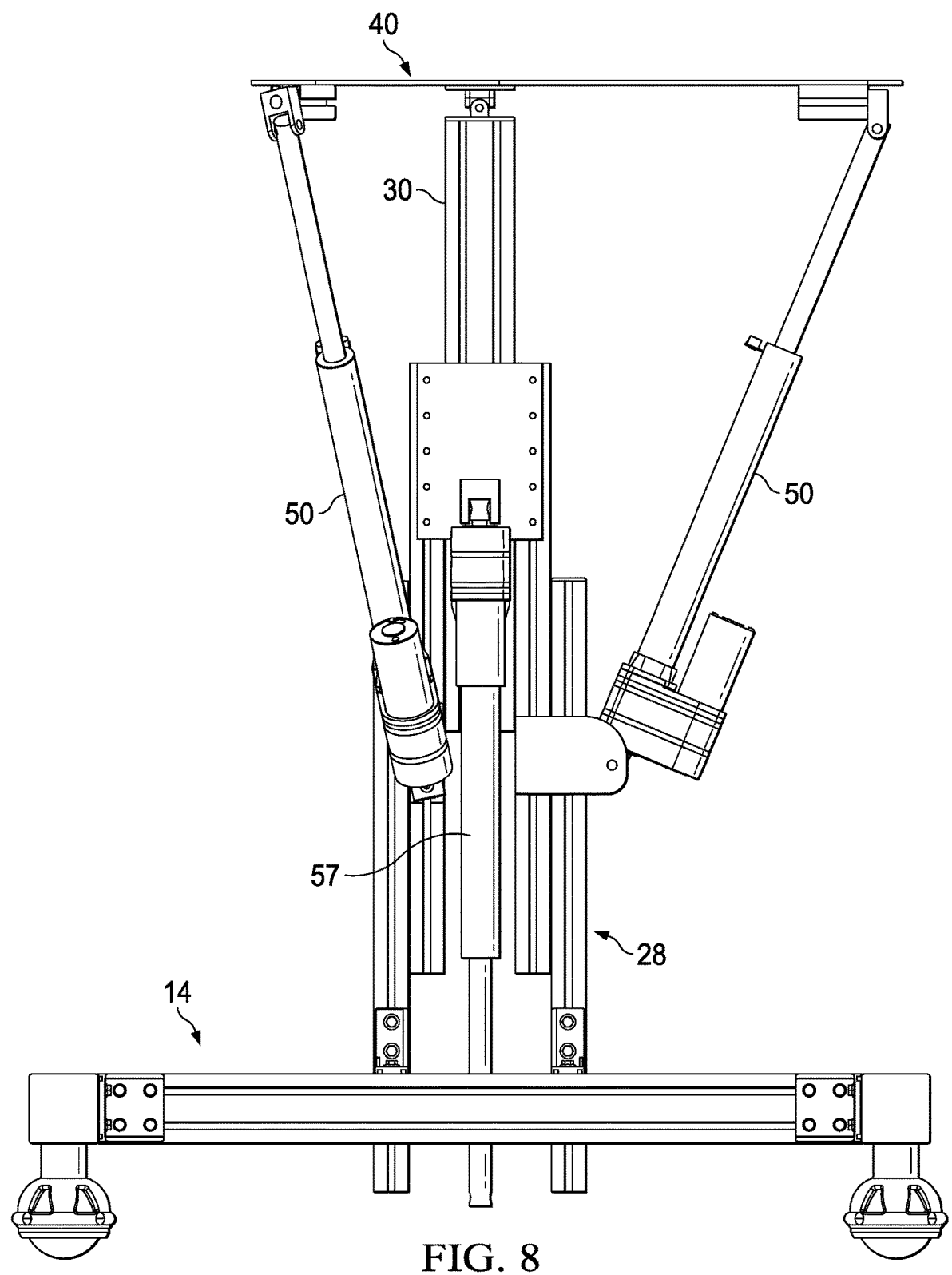
FIG. 8 depicts the illustrative work stand in a configuration having all extendable arms extended, the vertical support bracket elevated, and the vertical support member elevated.

Alternatively or in addition, vertical support bracket 28 itself can be coupled to moveable base frame 16 by an extension mechanism, such as a vertical support linear actuator 57 that is coupled at a lower end 58 to base frame 16, and coupled at an upper end 59 to vertical support member 30. Extension and retraction of vertical support linear actuator 57 can then facilitate movement of vertical support member 30 so that support platform 40 is controllably raised and lowered with respect to moveable base 14. As shown in FIG. 8, the height of support platform 40 can be increased with respect to the configuration of FIG. 7 by elevating vertical support bracket 28 using vertical support linear actuator 55, in combination with extending the length of the plurality of extendable arms 50. Vertical support linear actuator 57 can be selected from any of the varieties of linear actuator previously discussed for arm linear actuators 55.

In order to controllably and independently actuate each of the plurality of extendable arms 50, work stand 10 can additionally include a controller 60 that is coupled to each of the plurality of extendable arms 50, where controller 60 is configured to independently control the length of each of the plurality of extendable arms 50 by controllably extending and retracting each extendable arm. In this way controller 60 can position support platform 40 in a desired orientation by cooperatively adjusting the length of each of the plurality of extendable arms 50.

Controller 60 can additionally be coupled to vertical support linear actuator 57, so that controller 60 can adjust the height of vertical support member 30 in cooperation with controlling the configuration of each of the plurality of extendable arms 50. Furthermore, where moveable base 14 includes a drive mechanism 24 for effecting movement of work stand 10, controller 60 can be coupled to drive mechanism 24 so that controller 60 can be used to move moveable base 14, independently or in coordination with each of the plurality of extendable arms 50 and/or vertical support linear actuator 57, as shown in schematic diagram 62 of FIG. 9.

Figure 9:
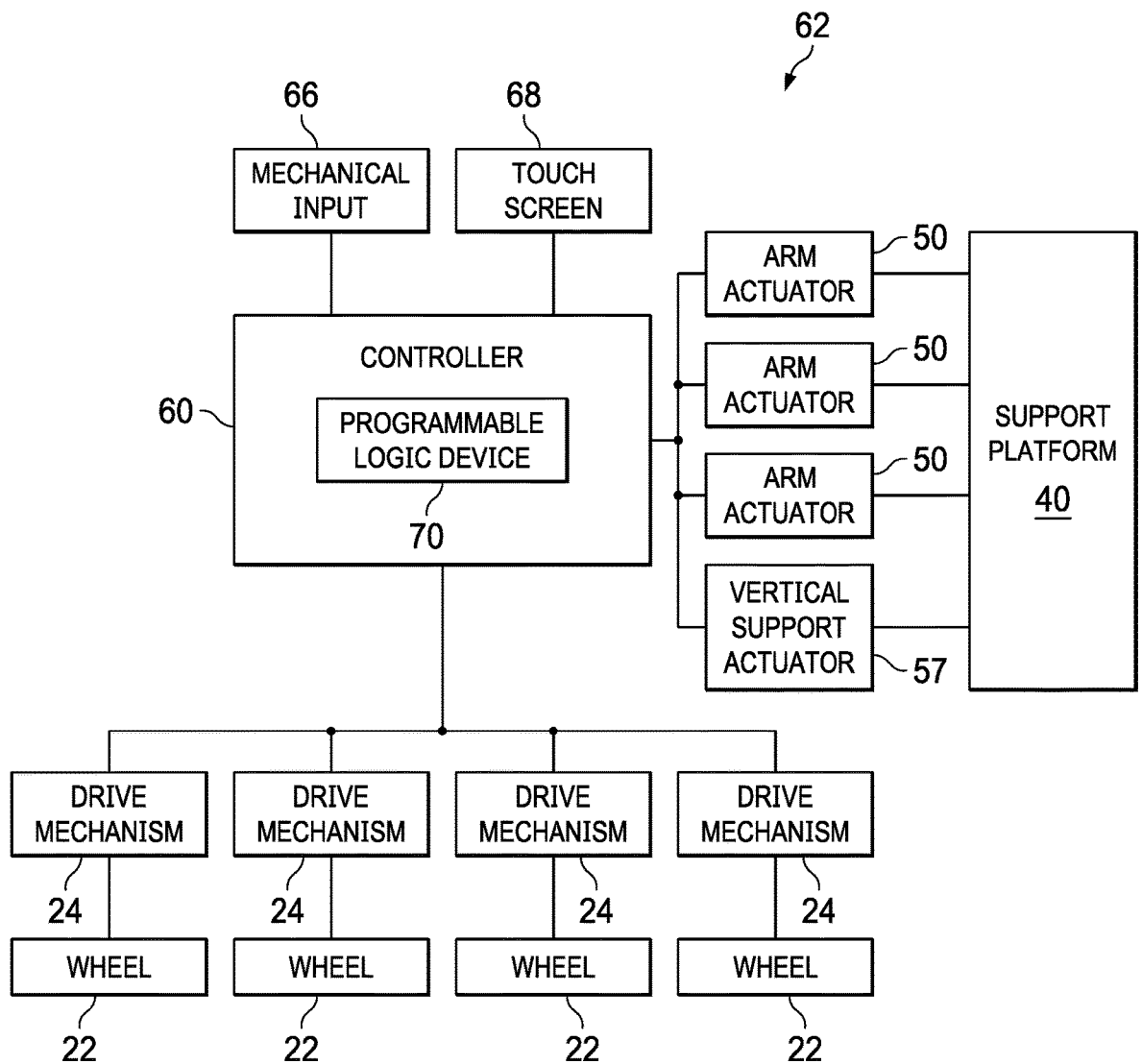
FIG. 9 is a schematic diagram showing the work stand controller and its connections various work stand components.

Also as shown in FIG. 9, controller 60 is additionally coupled to one or more user inputs 64, where each user input is adapted so that a user employing controller 60 can position support platform 40 in a desired orientation. For example where each of the plurality of extendable arms 50 includes an arm linear actuator 55, controller 60 can be configured to position support platform 40 in a desired orientation by independently and controllably extending or retracting each of the plurality of extendable arms 50 by independently operating the arm linear actuator 55 of each of the plurality of extendable arms 50.

Any form of user input that permits a user to position support platform 40 in a desired orientation using controller 60 is a suitable user input for the purposes of work stand 10, but user inputs that include one or both of a handheld mechanical input 66 and a touchscreen display input 68 can be particularly preferred.

Where user input 64 includes a handheld mechanical input 66, the handheld mechanical input can include one or more switches, thumbsticks, joysticks, triggers, and buttons for transmitting instructions to controller 60. As an example, handheld mechanical input 66 can include a game system controller, as game controllers typically feature a plurality of inputs, including inputs tailored for steering and/or positioning information. Additionally, many potential users are already familiar with the use of game system controllers, which can be coupled to controller 60 via a wired connection, or via any of a variety of well-known wireless communication standards, such as radio signals (i.e. via BLUETOOTH communication protocols) or infrared signals such as can be used for communication between a remote control and a television.

Where user input 64 includes a touchscreen display input 68, touchscreen display input 68 can be disposed on work stand 10 so that it us readily accessible by a user. Touchscreen display input 68 can be configured to display a menu system permitting a user to input commands to controller 60 relating to one or more of a desired position of work stand 10, a desired elevation of support platform 40, and a desired orientation of support platform 40.

Controller 60 can include a programmable logic device 70, such as a programmable logic controller, or PLC. A PLC is typically an industrial digital computer that has been ruggedized and adapted for the control of manufacturing processes, or industrial robots, with high reliability. They are additionally easy to program for specialized tasks.

Programmable logic device 70 can include one or more of a processor unit (CPU) that interprets inputs, executes a control program stored in memory and sends output signals; a memory unit configured to store data from inputs and program to be executed by the processor unit; input and output interfaces configured so the controller can receive and send data from/to external devices; and a power supply unit configured to convert AC voltage to DC.

Work stand 10 can additionally include a plurality of sensors, such as position sensors, accelerometers, weight sensors, and the like, and programmable logic device 70 can receive date from the plurality of sensors so as to provide feedback when components of work stand 10 are in motion. Such feedback can include load data, velocity data, and position data. Feedback from such sensors can also facilitate configuring programmable logic device 70 of controller 60 to be programmed with a plurality of preset configurations, where each preset configuration corresponds to a distinct and alternative orientation of support platform 40.

In addition, controller 60 can additionally be configured to put work stand 10 into a "safe mode" or "emergency mode" when receiving sensor feedback that indicates work stand 10 may be entering or creating a hazardous situation. For example, controller 60 can monitor sensor feedback in order to detect a load on work stand 10 that is out of defined safety ranges, or when a programmed movement will place work stand 10 in an area that may be hazardous to workers. Such a "safe mode" can take any of a variety of forms, such as for example a "safe mode" that causes all linear actuators, including arm linear actuators 55 and vertical support linear actuator 57, to be fully retracted, minimizing the size of the work stand, or a "safe mode" that disables all drive mechanisms and/or activates braking devices on wheels 22. Alternatively, or in addition the "safe mode" might operate to freeze all movable components where they are currently positioned.

Additionally, a programmable logic device 70 of a controller 60 of an individual work stand 10 can be designated a "master" controller, and can be programmed to carry out a desired operation, such that an additional plurality of work stands can then be configured as "slave" work stands in order to reproduce the operation of the master work stand.

System 82, including work stand 10 and cradle 12, typically includes a plurality of electrical systems, including electric drive mechanisms, electric linear actuators, and of course the electrical systems of controller 60 and user inputs 64. In one aspect of the disclosed work stands, every component of the electrical systems of work stand 10 can be explosion-proof, consistent with use in a Class I, Division I hazardous location. This can be true regardless of whether the electrical systems of work stand 10 is supplied from an external power source via cabling, or is supplied from one or more onboard generators or batteries incorporated into work stand 10.

As shown in FIG. 5, support platform 40 can include a central region 72 that couples to vertical support member 30 via support coupling 44, and a plurality of extensions 74 that couple central region 72 to distal extension ends 76, where upper ends 54 of the plurality of extendable arms are pivotally coupled to support platform 40. Although support platform 40 can be configured to provide direct support to a mechanical component or tool, more typically support platform 40 is instead configured to support a cradle 12 that is itself configured to directly support a selected mechanical component or tool in a desired orientation. The system 82 for supporting one or more mechanical components or tools, as described herein, includes work stand 10 in combination with one or more cradles 80 are adapted to be supported by support platform 40, where each cradle 12 is configured to support one or more mechanical components or tools.

System 82 of FIG. 1 includes a cradle 12 that is supported by support platform 40. Cradle 12 can be configured to support each of a plurality of distinct mechanical components and tools as it rests upon work stand 10. Cradle 12 can have any suitable shape or composition. For example cradle 12 can be solid, and possess a solid cradle surface made from a light metal or composite material. Alternatively, cradle 12 can be formed from a mesh or lattice of a lightweight but strong material. Cradle 12 can include a single surface, or can be comprised of a plurality of discrete support pads that function to support the desired mechanical component or tool as a single unit supportive unit.

Figure 10:
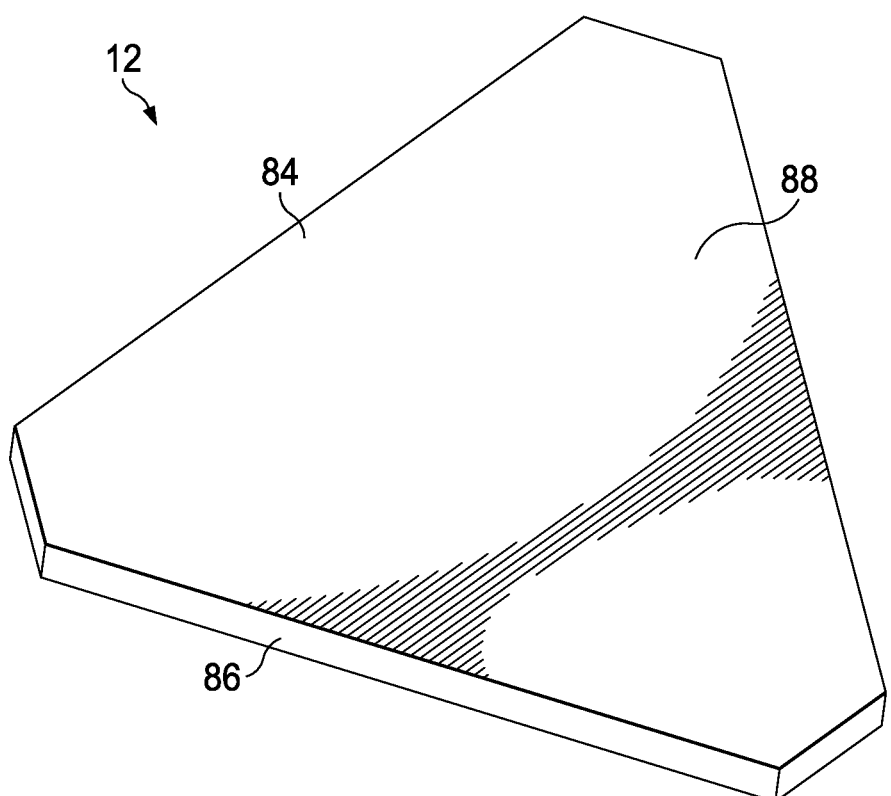
FIG. 10 depicts an illustrative cradle for the work stand system of the present disclosure.

Cradle 12 can include a cushioned cradle 84, as shown in FIG. 10, that can be fabricated to include an internal cushion 86, where cushion 86 confers upon cradle 84 a compressibility and resilience that permits the cushioned cradle to conform to a lower contour of a mechanical component or tool when it is disposed on, and supported by, cushioned cradle 84, thereby reducing the potential for damaging the mechanical component or tool. Any suitable internal cushion 86 may be employed in cushioned cradle 84, such as resilient elastomer cushions, foamed elastomer cushions, or air cushions, among others.

Additionally, or alternatively, upper surface 88 of cushioned cradle 84 can be fabricated using a surface material that is selected so that cushioned cradle 84 can support a mechanical component or tool that has painted surfaces, plated surfaces, vinyl surfaces, or other relatively delicate surface treatments without damaging the surface treatment of the mechanical component or tool. A variety of suitable surface materials can be employed in fabricating upper surface 88, including for example soft rubbers and plastics, microfiber cloth, among others. Surface 88 can additionally incorporate materials having a low coefficient of friction, such as polyfluorinated polymers (e.g. TEFLON) to prevent damage to a surface of the mechanical component or tool due to movement on the cushioned cradle 84.

Figure 11:
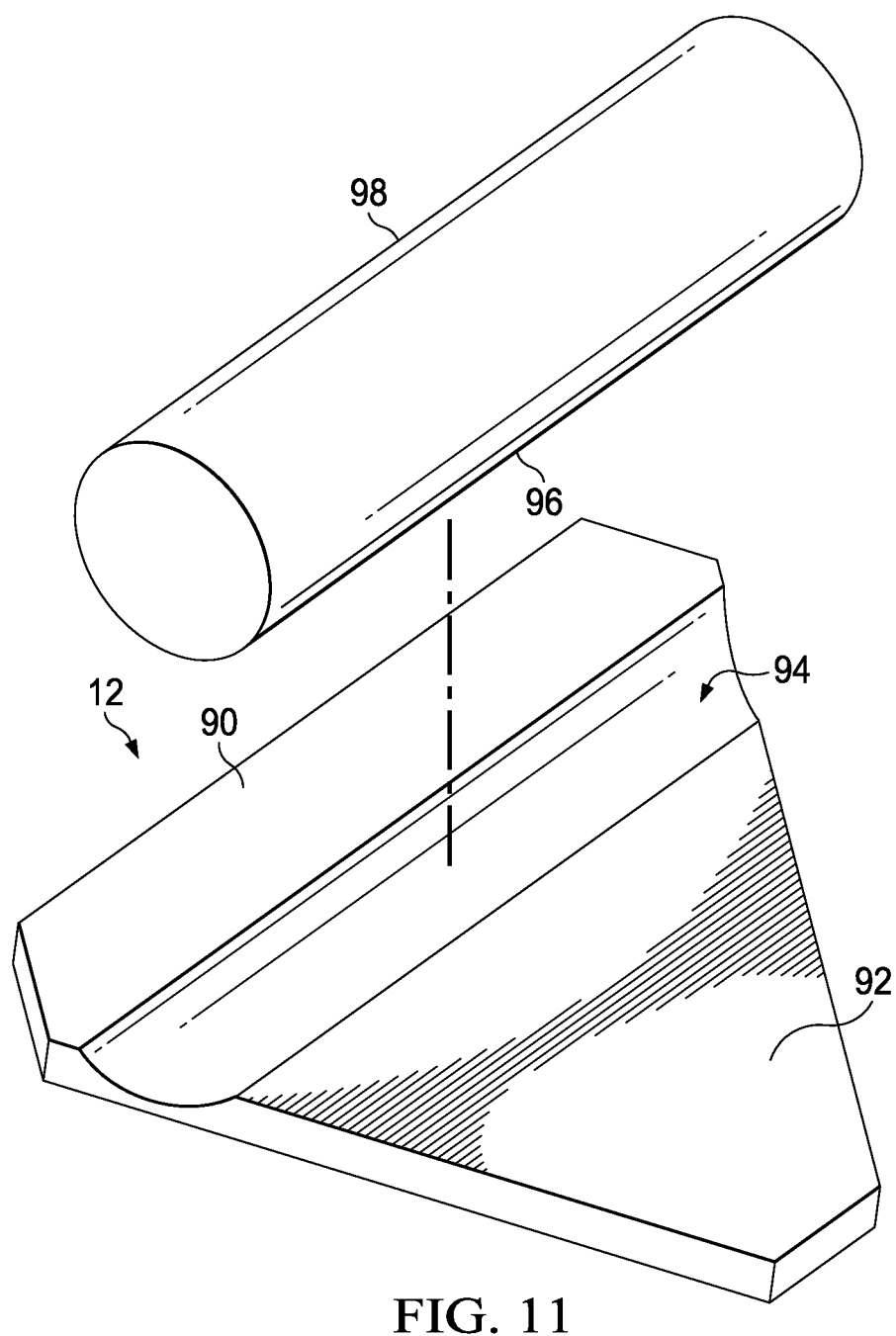
FIG. 11 depicts an illustrative complementary cradle for the work stand system of the present disclosure.

As an alternative, cradle 12 can include a complementary cradle 90, where complementary cradle 90 is configured to support, and to be complementary to, a particular mechanical component or tool. For example, while complementary cradle 90 can incorporate one or more of the features of cushioned cradle 84 described above, upper surface 92 of complementary cradle can define one or more surface contours 94 that are shaped to be complementary to a selected lower contour 96 of a selected mechanical component or tool. For example, and as shown in FIG. 11, complementary cradle 90 is fabricated so that upper surface 92 defines a concave and complementary surface contour 94 that is shaped and sized to be complementary to lower contour 96 of the cylindrical mechanical component 98. A variety of cradles configured with individual contours for specific mechanical components or tools can be envisioned, depending upon the intended use and usage of work stand 10.

Figure 12:
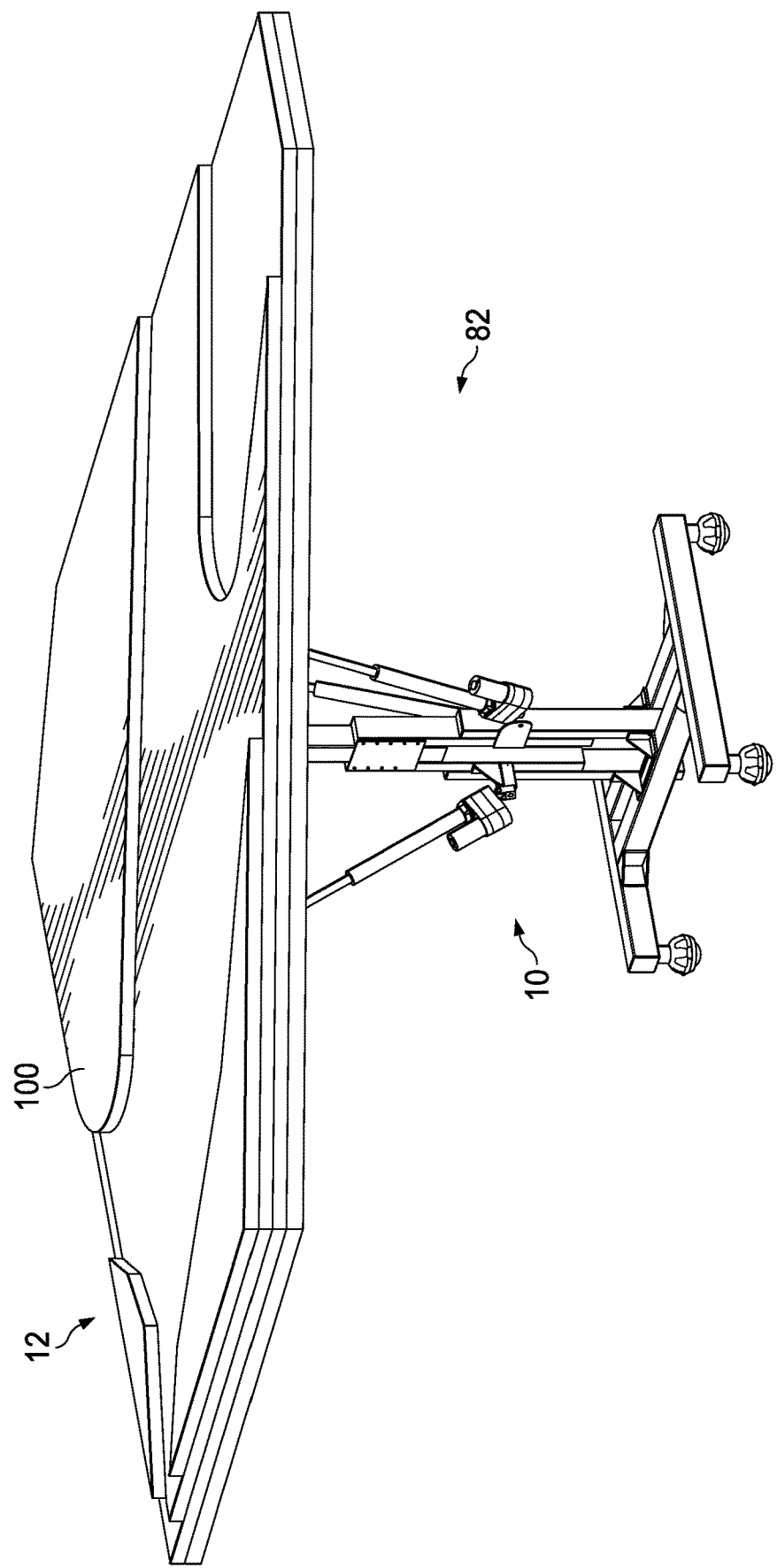
FIG. 12 depicts an illustrative contoured cradle for the work stand system of the present disclosure.
Figure 13:
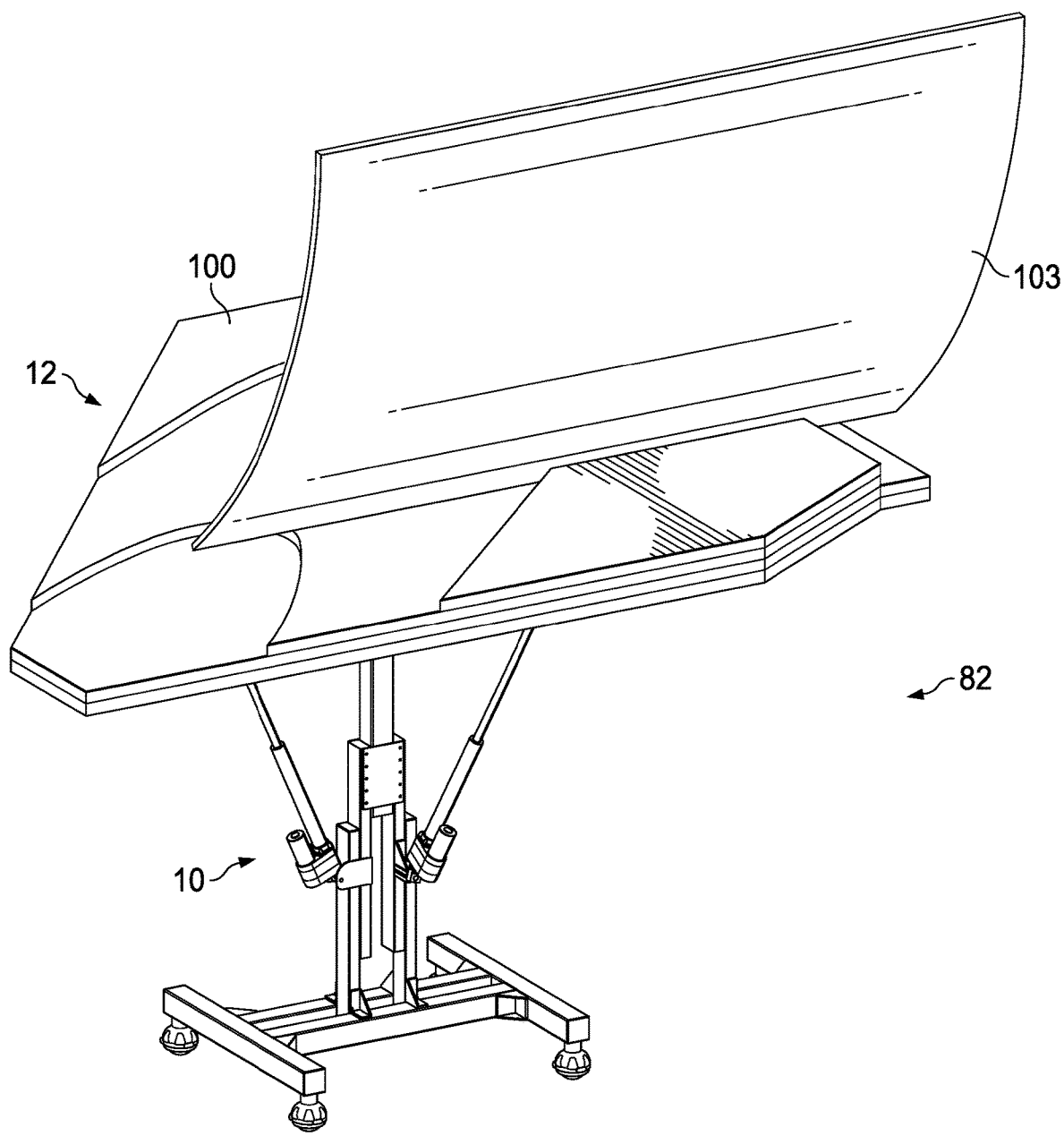
FIG. 13 depicts the work stand system of FIG. 12 supporting a fuselage panel.
Figure 14:
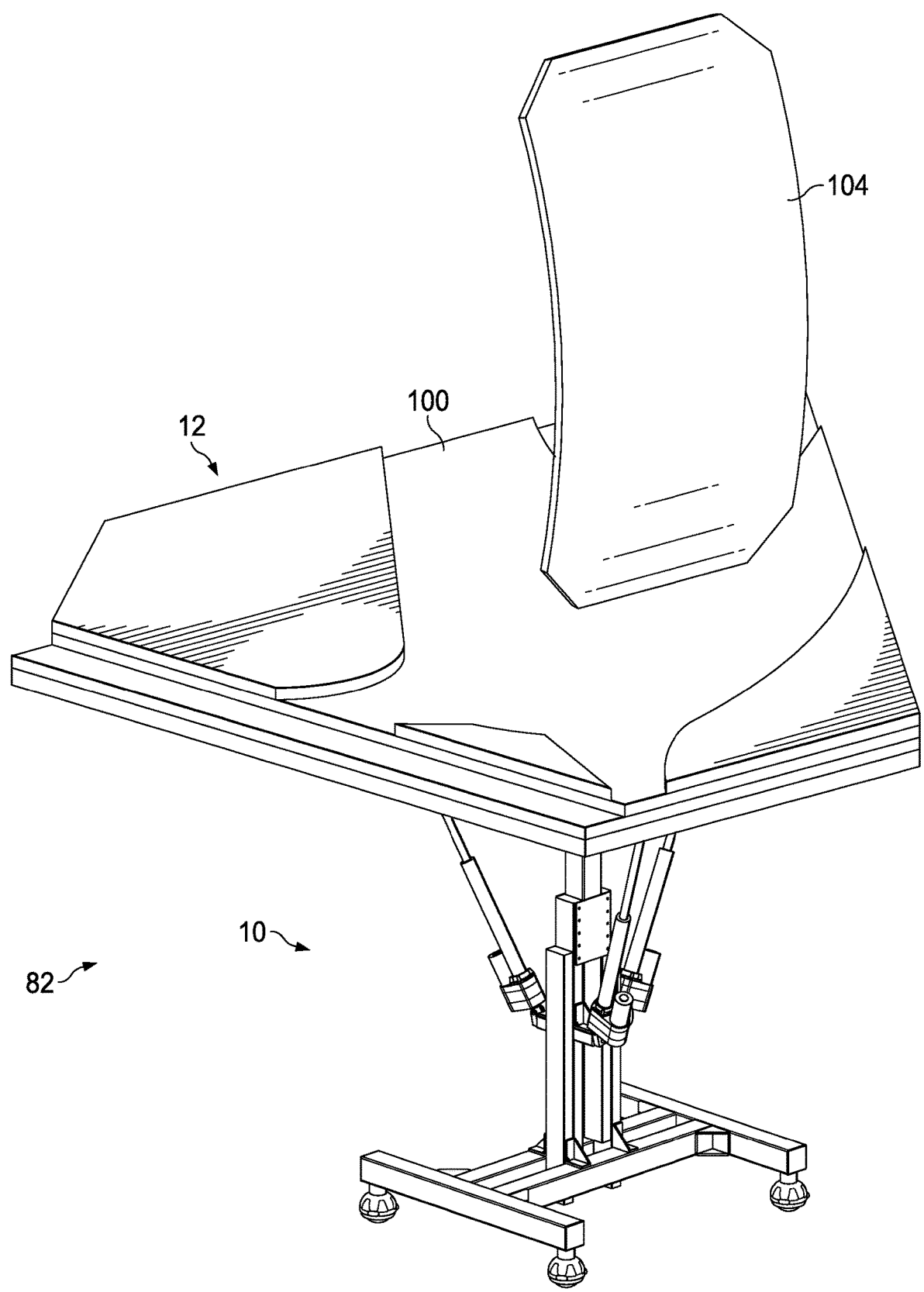
FIG. 14 depicts the work stand system of FIG. 12 supporting an aircraft door.
Figure 15:
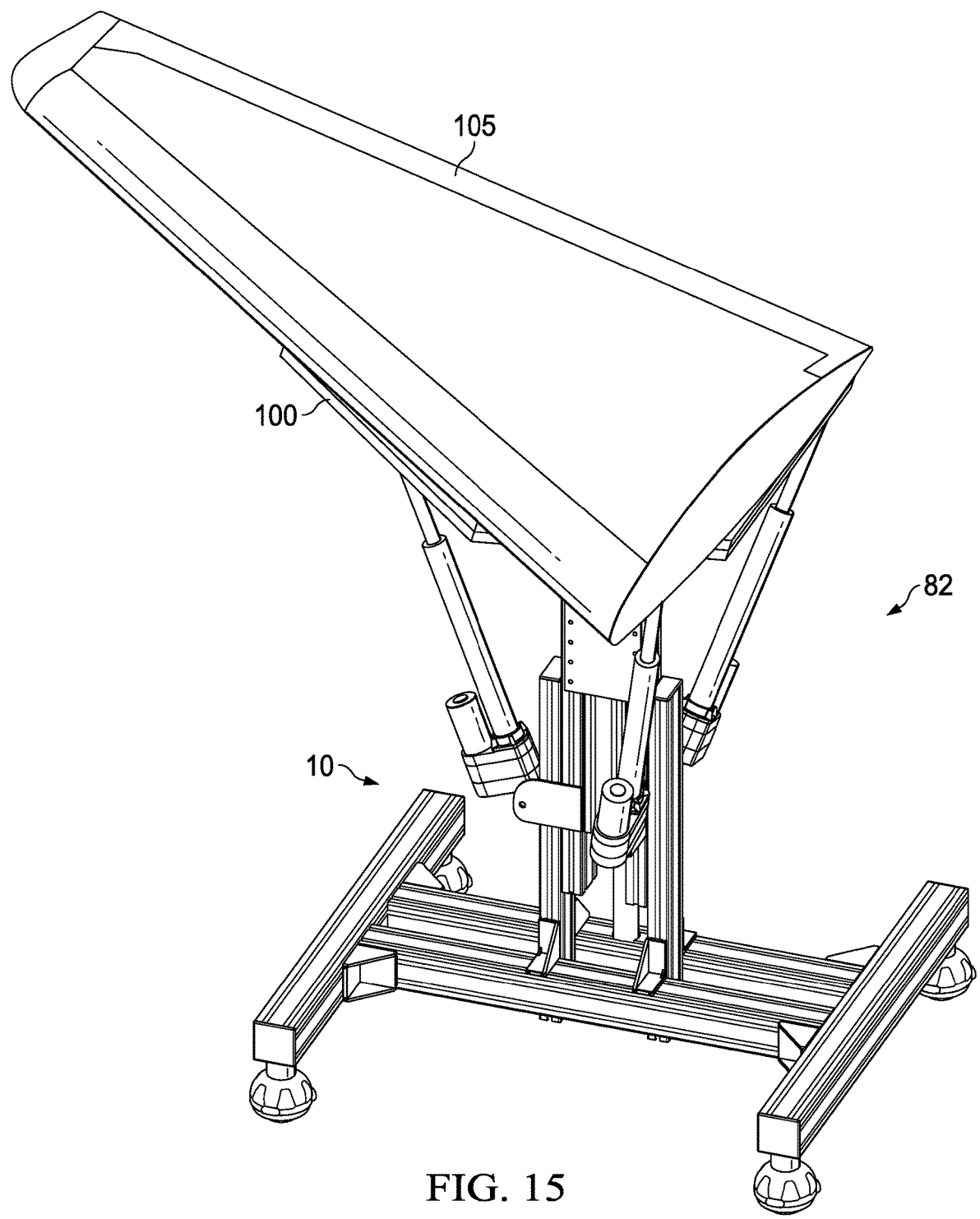
FIG. 15 depicts a work stand system of the present disclosure supporting a raked wingtip.

Alternatively, cradle 12 can be configured to incorporate a plurality of surface features and/or surface contours that are generally configured to enhance that cradle's support of a variety of different shapes and contours of mechanical components or tools, as shown in FIG. 12 for contoured cradle 100 in combination with work stand 10. The specific contours 102 formed on upper surface 88 of contoured cradle 100 can be intended to be generally useful for supporting a variety of mechanical components or tools. Alternatively, or in addition, the contours 102 can be designed to be generally useful for supporting commonly encountered components and tools for a particular industry. For example, as shown in FIGS. 13-15, a system 82 comprising work stand 10 and contoured cradle 100 can be configured so that cradle contours 102 are shaped to be useful for supporting tools and components commonly used in the assembly and/or maintenance of commercial aircraft, such as a fuselage panel 103 (FIG. 13), an aircraft door 104 (FIG. 14), and a replacement wingtip 105 (FIG. 15), among many others.

Alternatively, or in addition, cradle 12 can further include one or more securing mechanisms 106, where securing mechanisms 106 are configured to secure a desired mechanical component or tool to cradle 12. While securing mechanism 106 can simply rest on cradle 12 while helping secure a component or tool, typically securing mechanism 106 is coupled in some way to either work stand 10 or cradle 12 via an appropriate mounting mechanism 107. Appropriate mounting mechanisms 107 can include clamps, straps, or other fasteners; mechanical connections such as bolts, rivets, and pins; adhesives and welds, or any other method of attaching securing mechanism 106 to work stand 10 and/or cradle 12.

Securing mechanism 106 can additionally include one or more rigid support elements 108 that are configured to enhance the support of cradle 12 for a selected mechanical component or tool. Rigid support elements 108 can include one or more struts, rods, lattices, or other appropriate rigid elements.

Securing mechanism 106 can additionally and optionally include one or more coupling elements 110, where the coupling element 110 is configured to attach to, couple with, or otherwise stabilize the supported mechanical component or tool. One or more rigid support elements 108 can, but are not required to, couple mounting mechanism 107 to the one or more coupling elements 110, which in turn secure the supported mechanical component or tool.

Any coupling element that can positively interact with and secure a supported mechanical component or tool is an appropriate coupling element for system 82, cradle 12, and/or work stand 10. Appropriate coupling elements 110 can include one or more straps, cams, magnets, levers, adhesives, suction cups, and the like. Alternatively, or in addition, coupling element 110 can be specific for a particular mechanical component or tool. For example, a coupling element 110 can be configured to positively engage with a feature of the mechanical component or tool, forming a strong attachment thereby. For example, coupling element 110 can be configured to interface with existing apertures in the supported mechanical component or tool, such as existing apertures for fasteners. Alternatively, coupling element 110 can be shaped to selectively clamp to an external feature of the supported mechanical component or tool.

Figure 16:
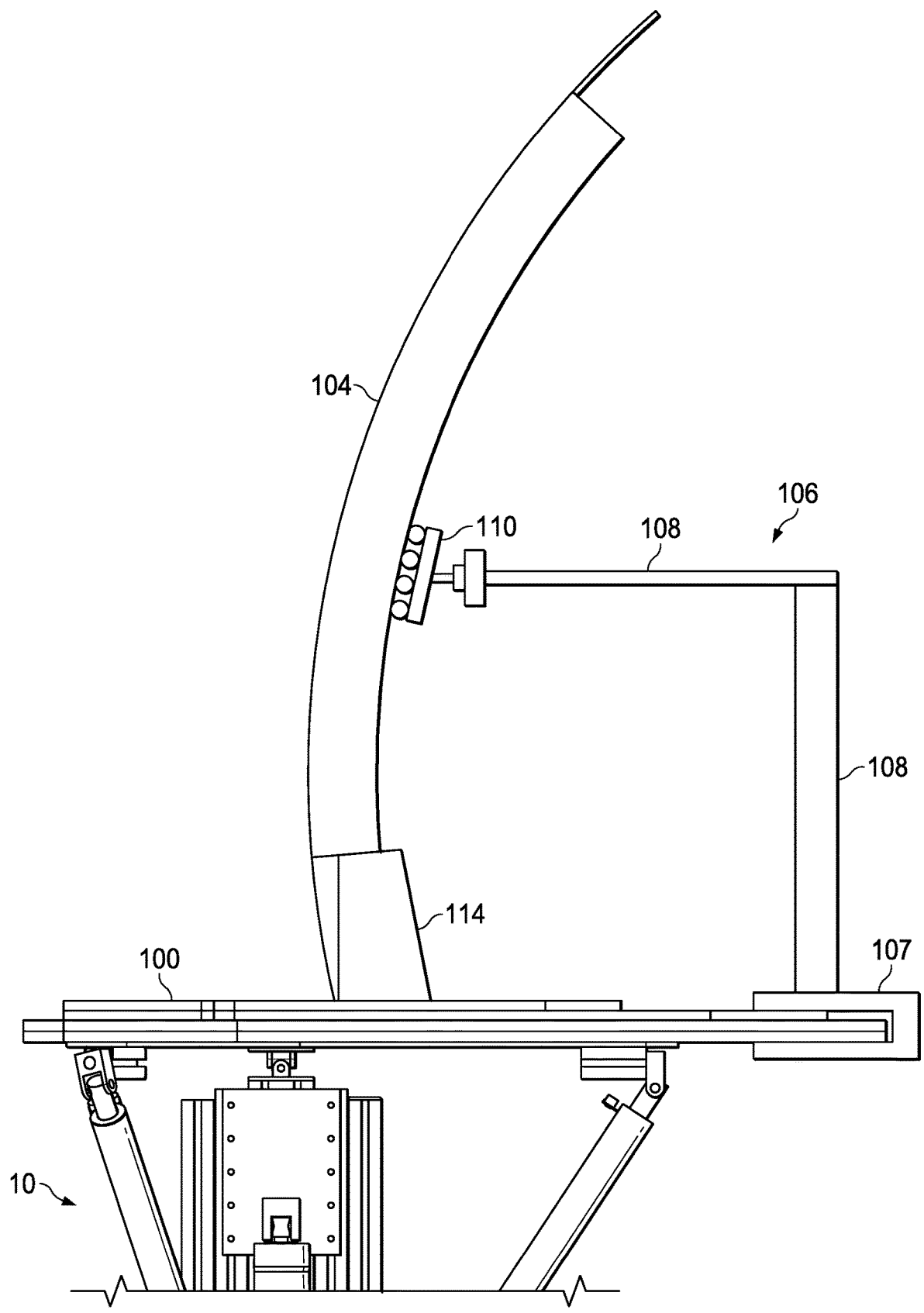
FIG. 16 depicts a work stand system of the present disclosure supporting an aircraft door with a securing mechanism.

An exemplary securing mechanism 106 for securing an aircraft door 104 is depicted in FIG. 16, including a mounting mechanism 107 attaching securing mechanism 106 to contoured cradle 100, one or more rigid support elements 108 attach mounting mechanism 107 to coupling element 110, where coupling element 110 is configured to positively attach to aircraft door 104. Securing mechanism 106 serves to stabilize aircraft door 104 on contoured cradle 100, as well as retaining aircraft door 104 in a vertical orientation. Additionally, aircraft door 104 rests partially upon a pad 114, where pad 114 is at least partially shaped to support and cushion aircraft door 104, and help to support and stabilize aircraft door 104 on contoured cradle 100. Pad 114 is optionally substantially incompressible, or optionally resilient and deformable, where deformation can be reversible or irreversible.

Work stand 10 can be advantageously used in virtually any industry where mechanical components or tools must be supported above a work surface, positioned accurately and/or aligned. The use of work stand 10 can be particularly advantageous when used in aircraft assembly or maintenance, as supporting components and tools from underneath can replace the current use of overhead cranes for positioning and aligning components and tools.

The use of work stand 10 can be even more advantageously used for methods of performing desired assembly or maintenance on an aircraft, where work stand 10 is employed in combination with a mobile work station that includes a work platform, an accessway providing access to the work platform, and a base supporting the work platform such that the work platform can be raised and lowered, as described in U.S. patent application Ser. No. 16/897,177 (METHOD AND SYSTEM FOR AIRCRAFT ASSEMBLY AND MAINTENANCE; filed Jun. 9, 2020) which is hereby incorporated by reference for all purposed.

Figure 17:
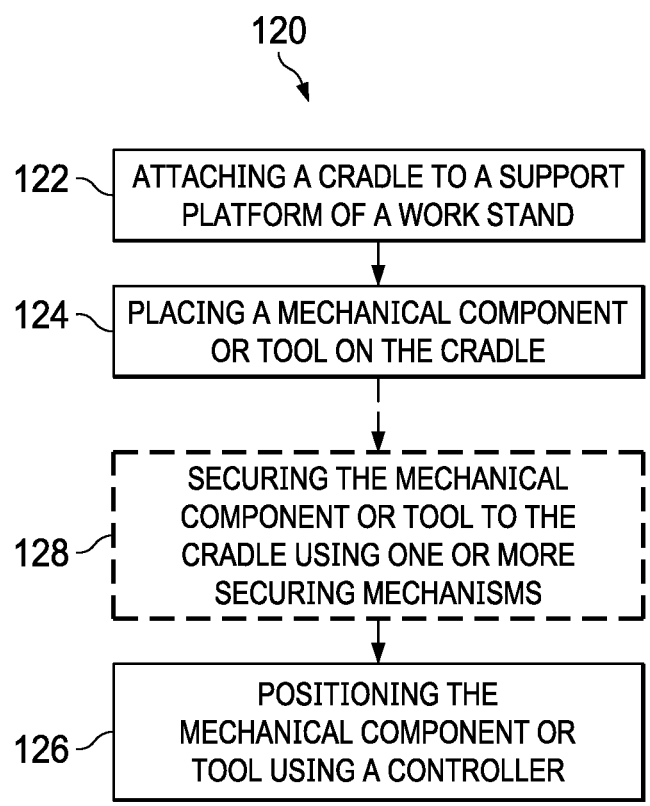
FIG. 17 is a flowchart for an illustrative method of positioning a mechanical component or tool according to the present disclosure.

The work stand and work stand systems of the present disclosure may be employed in a method of positioning a mechanical component or tool, as set out in flowchart 120 of FIG. 17, where the method includes attaching a cradle to a support platform of a work stand as described above, as shown at step 122 of flowchart 120; placing a mechanical component or tool on the cradle, as shown at step 124 of flowchart 120; positioning the mechanical component or tool using a controller configured to independently and controllably extend and retract each extendable arm of the work stand, and to raise and lower the vertical support member of the work stand, as shown at step 126 of flowchart 120.

The step of placing the mechanical component or tool on the cradle, as shown at step 124 of flowchart 120, optionally further includes securing the mechanical component or tool to the cradle using one or more securing mechanisms, as shown at step 128 of flowchart 120.

The step of positioning the mechanical component or tool using the controller, as shown at step 126 of flowchart 120, optionally includes employing a user input that is coupled to the controller to position the cradle in the desired orientation and at the desired elevation.

(4) ILLUSTRATIVE COMBINATIONS AND ADDITIONAL EXAMPLES

This section describes additional aspects and features of the disclosed work stands, systems, and methods of performing assembly or maintenance, presented without limitation as a series of paragraphs, some or all of which can be alphanumerically designated for clarity and efficiency. Each of these paragraphs can be combined with one or more other paragraphs, and/or with disclosure from elsewhere in this application in any suitable manner. Some of the paragraphs below expressly refer to and further limit other paragraphs, providing without limitation examples of some of the suitable combinations.

A1. A work stand for a mechanical component or tool, including a moveable base; a vertical support member disposed on the moveable base; a support platform configured to directly or indirectly support the mechanical component or tool, where the support platform is attached to an upper end of the vertical support member via a support coupling that permits independent rotational movement between the support platform and the upper end of the vertical support member around two orthogonal axes; a plurality of extendable arms, each extendable arm being pivotally coupled at a lower end to the vertical support member, and pivotally coupled at an upper end to the support platform, where each extendable arm is configured to be independently and controllably extended and retracted; a controller coupled to each of the plurality of extendable arms and configured to independently control a length of each extendable arm by controllably extending and retracting said extendable arm, such that the controller positions the support platform in a desired orientation by cooperatively adjusting the length of each of the plurality of extendable arms; and a user input coupled to the controller and configured so that a user employing the controller can position the support platform in the desired orientation.

A2. The work stand of paragraph A1, where the moveable base rests upon a plurality of wheels.

A3. The work stand of paragraph A1, where the moveable base rests upon a plurality of wheels, the base additionally includes a drive mechanism for driving one or more of the plurality of wheels, and the controller is configured so that a user employing the controller can direct a movement of the work stand.

A4. The work stand of paragraph A1, where the support platform is coupled to the upper end of the vertical support member via a support coupling that incorporates a flexible and resilient material coupling, a ball joint coupling, or a gimbal coupling.

A5. The work stand of paragraph A1, where the vertical support member is configured to be controllably raised and lowered with respect to the moveable base, and the controller is configured to control an elevation of the support platform by raising and lowering the vertical support member.

A6. The work stand of paragraph A1, where the work stand includes three extendable arms, each extendable arm includes an arm linear actuator, and the controller is configured to independently and controllably extend and retract each extendable arm by operating the arm linear actuator of that extendable arm.

A7. The work stand of paragraph A1, where the controller includes a programmable logic device.

A8. The work stand of paragraph A1, where the controller can be programmed with a plurality of preset configurations, where each preset configuration corresponds to a distinct alternative desired orientation of the support platform.

A9. The work stand of paragraph A1, where the user input includes one or both of a handheld mechanical input and a touchscreen display input disposed on the work stand.

A10. The work stand of paragraph A1, where the support platform supports a cradle that is configured to support one or more mechanical components or tools in the desired orientation.

B1. A system for supporting one or more mechanical components or tools, including a work stand, where the work stand includes a wheeled base; a vertical support member disposed on the wheeled base; where the vertical support member is configured to be controllably raised and lowered with respect to the wheeled base; a support platform configured to directly or indirectly support the mechanical component or tool, where the support platform is attached to an upper end of the vertical support member via a support coupling that permits independent rotational movement between the support platform and the upper end of the vertical support member around two orthogonal axes; three extendable arms, each extendable arm being pivotally coupled at a lower end to the vertical support member, and pivotally coupled at an upper end to the support platform, where each extendable arm is configured to be independently and controllably extended and retracted; a controller coupled to each of the three extendable arms and the vertical support member, where the controller is configured to independently control a length of each extendable arm by controllably extending and retracting said extendable arm, such that the controller can position the cradle in a desired orientation; and where the controller is configured to raise and lower the vertical support member, such that the controller can position the cradle at a desired elevation; and a user input coupled to the controller and configured so that a user employing the controller can position the cradle in the desired orientation; and at least one cradle that is adapted to be supported by the support platform, where said at least one cradle is configured to support one or more mechanical components or tools.

B2. The system of paragraph B1, where the at least one cradle is configured to support each of a plurality of distinct mechanical components and tools.

B3. The system of paragraph B1, where the at least one cradle is configured to be complementary with and to support a particular mechanical component or tool.

B4. The system of paragraph B1, where the at least one cradle includes an upper surface that is configured to support a mechanical component or tool that has painted surfaces, plated surfaces, or vinyl surfaces without damaging the mechanical component or tool.

B5. The system of paragraph B1, where the at least one cradle is a cushioned cradle that is configured to conform to a lower contour of the mechanical component or tool.

B6. The system of paragraph B5, where the cushioned cradle includes one or more cushions that include resilient elastomers, foamed elastomers, or air cushions.

B7. The system of paragraph B1, where the at least one cradle further includes one or more securing mechanisms configured to secure the mechanical component or tool to the at least one cradle.

B8. The system of paragraph B7, where the securing mechanisms include one or more straps, cams, magnets, levers, adhesives, or suction cups configured to secure the mechanical component or tool to the at least one cradle.

B9. The system of paragraph B7, where the securing mechanisms include one or more rigid support elements that improve the configuration of the at least one cradle to support one or more mechanical components or tools.

B10. The system of paragraph B9, where the one or more rigid support elements are configured to positively interact with the mechanical component or tool.

C1. A method of positioning a mechanical component or tool, including attaching a cradle to a support platform of a work stand; where the cradle is configured to support one or more mechanical components or tools; the support platform is attached to an upper end of a vertical support member of the work stand via a support coupling that permits independent rotational movement between the support platform and the upper end of the vertical support member around two orthogonal axes; and where the vertical support member is disposed on a moveable base, and is configured to be controllably raised and lowered with respect to the moveable base to achieve a desired elevation of the support platform and therefore of the cradle; the support platform is coupled to the vertical support member by three extendable arms, each extendable arm being pivotally coupled at a lower end to the vertical support member, and pivotally coupled at an upper end to the support platform; and where each extendable arm is configured to be independently and controllably extended and retracted to achieve a desired orientation of the support platform and therefore of the cradle; placing the mechanical component or tool on the cradle; and positioning the mechanical component or tool using a controller configured to independently and controllably extend and retract each extendable arm, and to raise and lower the vertical support member.

C2. The method of positioning a mechanical component or tool of paragraph C1, where placing the mechanical component or tool on the cradle further includes securing the mechanical component or tool to the cradle using one or more securing mechanisms.

C3. The method of positioning a mechanical component or tool of paragraph C1, where positioning the mechanical component or tool using the controller includes employing a user input that is coupled to the controller to position the cradle in the desired orientation and at the desired elevation.

(5) ADVANTAGES, FEATURES, AND BENEFITS

The presently described work stands, work stand systems, and methods of positioning a mechanical component or tool provide significant benefits when compared to prior methods and systems for performing assembly or maintenance of large-scale mechanical systems, and in particular when performing assembly or maintenance on the external surfaces of commercial aircraft.

Aeronautics industries have typically relied upon fixed hangers and the use of overhead cranes in the assembly or service of aircraft. This need for overhead cranes has created bottlenecks in service where available cranes may be limited. The work stands, systems, and methods described herein can permit even challenging service procedures to be carried out supporting tools and components above the work surface, without requiring access to an overhead crane.

The disclosed work stands additionally offer substantial improvements in safety, as the movement of heavy components overhead with cranes creates inherent safety issues, both from having personnel straying beneath a suspended load, and the risk of pinching or crushing due to a swaying component. Using the presently described systems, such heavy components are fully supported at all times, and can be positioned and/or aligned accurately without risk of pinching.

Furthermore, many aircraft components can be overengineered precisely because it is anticipated that they will be moved by crane. Wingtips, for example, are typically built on a central spar for strength, and include internal ribs, a leading edge, top sheeting, and bottom sheeting to be operationally functional. Unfortunately, in order to move the wingtip using a crane without damage, the wingtip must include additional intercostal reinforcement, which requires additional time to design, machine, inspect, coat, and install, in addition to the additional weight penalty incurred.

In addition, the work stand systems of the present disclosure are sufficiently compact that they can be easily shipped where needed, even to unimproved airfields where aircraft may be stranded and requiring service, but where there is no access to conventional crane systems.

(6) CONCLUSION

The presently described work stands, work stand systems, and methods of positioning a mechanical component or tool offer dramatically increased flexibility in conducting mechanical assembly, service, and maintenance operations. In addition, the work can be performed more quickly, with greater precision and user safety than can be achieved with current methods.

The disclosure set forth above may encompass multiple distinct examples with independent utility. Although each of these has been disclosed in its preferred form(s), the specific examples thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A work stand for a mechanical component or tool, comprising:
    a moveable base;
    a vertical support member disposed on the moveable base;
    a support platform attached to an upper end of the vertical support member via a support coupling that permits independent rotational movement between the support platform and the upper end of the vertical support member around two orthogonal axes;
    a plurality of extendable arms, each extendable arm being pivotally coupled at a lower end to the vertical support member, and pivotally coupled at an upper end to the support platform, wherein each extendable arm independently and controllably extends and retracts; and
    a controller coupled to each of the plurality of extendable arms, wherein the controller independently controls a length of each extendable arm by extending and retracting said extendable arm, such that the controller positions the support platform in a desired orientation by cooperatively adjusting the length of each of the plurality of extendable arms; and
    a user input coupled to the controller and allowing a user to employ the controller to position the support platform in the desired orientation.

2. The work stand of claim 1, wherein the moveable base rests upon a plurality of wheels.

3. The work stand of claim 1, wherein the moveable base rests upon a plurality of wheels, the moveable base additionally includes a drive mechanism for driving one or more of the plurality of wheels, and the controller allows a user employing the controller to direct a movement of the work stand.

4. The work stand of claim 1, wherein the support platform is coupled to the upper end of the vertical support member via a support coupling that incorporates a flexible and resilient material coupling, a ball joint coupling, or a gimbal coupling.

5. The work stand of claim 1, wherein the vertical support member can be raised and lowered with respect to the moveable base, and the controller controls an elevation of the support platform by raising and lowering the vertical support member.

6. The work stand of claim 1, wherein the work stand includes three extendable arms, each extendable arm includes an arm linear actuator, and the controller independently and controllably extends and retracts each extendable arm by operating the arm linear actuator of that extendable arm.

7. The work stand of claim 1, wherein the controller includes a programmable logic device.

8. The work stand of claim 1, wherein the controller can be programmed with a plurality of preset configurations, wherein each preset configuration corresponds to a distinct alternative desired orientation of the support platform.

9. The work stand of claim 1, wherein the user input includes one or both of a handheld mechanical input and a touchscreen display input disposed on the work stand.

10. The work stand of claim 1, wherein the support platform supports a cradle that supports one or more mechanical components or tools in the desired orientation.

11. A system for supporting one or more mechanical components or tools, comprising:
    at least one cradle that is configured to support the one or more mechanical components or tools; and
    a work stand, wherein the work stand includes a wheeled base;
    a vertical support member disposed on the wheeled base; where the vertical support member controllably raises and lowers with respect to the wheeled base;
    a support platform supporting the at least one cradle, where the support platform is attached to an upper end of the vertical support member via a support coupling that permits independent rotational movement between the support platform and the upper end of the vertical support member around two orthogonal axes;

three extendable arms, each extendable arm being pivotally coupled at a lower end to the vertical support member, and pivotally coupled at an upper end to the support platform, wherein each extendable arm independently and controllably extends and retracts;

a controller coupled to each of the three extendable arms and the vertical support member, wherein the controller independently controls a length of each extendable arm by extending and retracting said extendable arm, such that the controller can position the cradle in a desired orientation; and wherein the controller raises and lowers the vertical support member, such that the controller can position the cradle at a desired elevation; and a user input coupled to the controller and allowing a user to employ the controller to position the cradle in the desired orientation.

12. The system of claim 11, wherein said at least one cradle is configured to support each of a plurality of distinct mechanical components and tools.

13. The system of claim 11, wherein said at least one cradle is complementary with and is configured to support a particular mechanical component or tool.

14. The system of claim 11, wherein said at least one cradle includes an upper surface that is configured to contact painted surfaces, plated surfaces, or vinyl surfaces of a mechanical component or tool without damaging the mechanical component or tool.

15. The system of claim 11, wherein said at least one cradle is a cushioned cradle that conforms to a lower contour of a mechanical component or tool.

16. The system of claim 15, wherein the cushioned cradle includes one or more cushions that include resilient elastomers, foamed elastomers, or air cushions.

17. The system of claim 11, wherein said at least one cradle further includes one or more securing mechanisms to secure the one or more mechanical components or tools to the at least one cradle.

18. The system of claim 17, wherein the securing mechanisms include one or more rigid support elements that improve support of the one or more mechanical components or tools by the cradle.

19. A method of positioning a mechanical component or tool, comprising:

attaching a cradle to a support platform of a work stand; wherein:

the cradle is configured to support one or more mechanical components or tools;

the support platform is attached to an upper end of a vertical support member of the work stand via a support coupling that permits independent rotational movement between the support platform and the upper end of the vertical support member around two orthogonal axes; and wherein the vertical support member is disposed on a moveable base, and controllably raises and lowers with respect to the moveable base to achieve a desired elevation of the support platform and therefore of the cradle;

the support platform is coupled to the vertical support member by three extendable arms, each extendable arm being pivotally coupled at a lower end to the vertical support member, and pivotally coupled at an upper end to the support platform; and wherein each extendable arm independently and controllably extends and retracts to achieve a desired orientation of the support platform and therefore of the cradle;

placing the mechanical component or tool on the cradle; and positioning the mechanical component or tool using a controller to extend and retract each extendable arm, and to raise and lower the vertical support member.

20. The method of positioning a mechanical component or tool of claim 19, wherein placing the mechanical component or tool on the cradle further includes securing the mechanical component or tool to the cradle using one or more securing mechanisms.

\* \* \* \* \*